US012658783B2

(12) United States Patent  
Abou Qamar

(10) Patent No.: US 12,658,783 B2  
(45) Date of Patent: Jun. 16, 2026

(54) POWER CONVERTER AND METHOD OF OPERATING

(71) Applicant: GE Aviation Systems LLC, Grand Rapids, MI (US)

(72) Inventor: Nezar Abou Qamar, Dayton, OH (US)

(73) Assignee: GE Aviation Systems LLC, Grand Rapids, MI (US)

( * ) Notice: Subject to any disclaimer, the term of this patent is extended or adjusted under 35 U.S.C. 154(b) by 185 days.

(21) Appl. No.: 18/415,152

(22) Filed: Jan. 17, 2024

(65) Prior Publication Data

US 2025/0233507 A1 Jul. 17, 2025

(51) Int. Cl.
| | |
|---|---|
| *H02M 1/00* | (2007.01) |
| *H02M 1/088* | (2006.01) |
| *H02M 3/06* | (2006.01) |
| *H02M 3/158* | (2006.01) |
| *H02M 7/483* | (2007.01) |

(52) U.S. Cl.
CPC ......... *H02M 1/088* (2013.01); *H02M 1/0074* (2021.05); *H02M 1/0095* (2021.05); *H02M 3/06* (2013.01); *H02M 3/158* (2013.01); *H02M 3/1586* (2021.05); *H02M 7/4833* (2021.05)

(58) Field of Classification Search
CPC ............. H02M 1/0003; H02M 1/0009; H02M 1/0012; H02M 1/007; H02M 1/0074; H02M 1/009; H02M 1/0095; H02M 1/08; H02M 1/088; H02M 3/01; H02M 3/06; H02M 3/07; H02M 3/156; H02M 3/158;

(Continued)

(56) References Cited

U.S. PATENT DOCUMENTS

| | | |
|---|---|---|
| 6,349,044 B1 | 2/2002 | Canales-Abarca et al. |
| 7,061,777 B2 | 6/2006 | Zeng et al. |

(Continued)

FOREIGN PATENT DOCUMENTS

| | | |
|---|---|---|
| EP | 3675345 A1 | 7/2020 |
| JP | 2017077096 A | 4/2017 |
| WO | 2021203592 A1 | 10/2021 |

OTHER PUBLICATIONS

Longcheng Tan; Bin Wu; Sebastian Rivera; Venkata Yaramasu; "Comprehensive DC Power Balance Management in High-Power Three-Level DC-DC Converter for Electric Vehicle Fast Charging"; Feb. 2, 2015; IEEE; IEEE Transactions on Power Electronics ( vol. 31, Issue: 1, Jan. 2016) (Year: 2015).*

(Continued)

*Primary Examiner* — Thienvu V Tran  
*Assistant Examiner* — Shahzeb K Ahmad  
(74) *Attorney, Agent, or Firm* — Thomas | Horstemeyer, LLP

(57) ABSTRACT

A power converter includes a first and a second set of switching elements communicatively coupled with a first capacitor and a second capacitor. A controller is configured to cyclically command a first operation of the first set of switches to supply an electrical current to the first capacitor for a first duration, followed by a first interval to terminate the electrical current to the first capacitor. The controller is further configured to cyclically command a second operation of the second set of switches to provide the electrical current to the second capacitor for a second duration followed by a second interval to terminate the electrical current to the second capacitor.

17 Claims, 6 Drawing Sheets

(58) Field of Classification Search
CPC .. H02M 3/1584; H02M 3/1586; H02M 7/483;
H02M 7/4833; H02M 7/487
See application file for complete search history.

(56) References Cited

U.S. PATENT DOCUMENTS

| | | | |
|---|---|---|---|
| 8,411,473 B2 | 4/2013 | Cheng et al. | |
| 9,520,792 B2 | 12/2016 | He et al. | |
| 10,536,087 B1* | 1/2020 | He ..................... | H02M 3/3376 |
| 11,088,631 B2 | 8/2021 | Zhang et al. | |
| 2004/0239298 A1* | 12/2004 | Norrga ................. | H02M 7/487 |
| | | | 323/282 |
| 2006/0049813 A1 | 3/2006 | Hendrix | |
| 2021/0203236 A1* | 7/2021 | Zhang .............. | H02M 3/33561 |
| 2022/0311337 A1* | 9/2022 | Zhang .................. | H02J 7/0014 |
| 2024/0079966 A1* | 3/2024 | Shuai ..................... | H02M 7/49 |

OTHER PUBLICATIONS

L. Tan, B. Wu, S. Rivera and V. Yaramasu, "Comprehensive DC Power Balance Management in High-Power Three-Level DC-DC Converter for Electric Vehicle Fast Charging", IEEE Transactions on Power Electronics, vol. 31, No. 1, pp. 89-100, Jan. 2016, doi: 10.1109/TPEL.2015.2397453.

\* cited by examiner

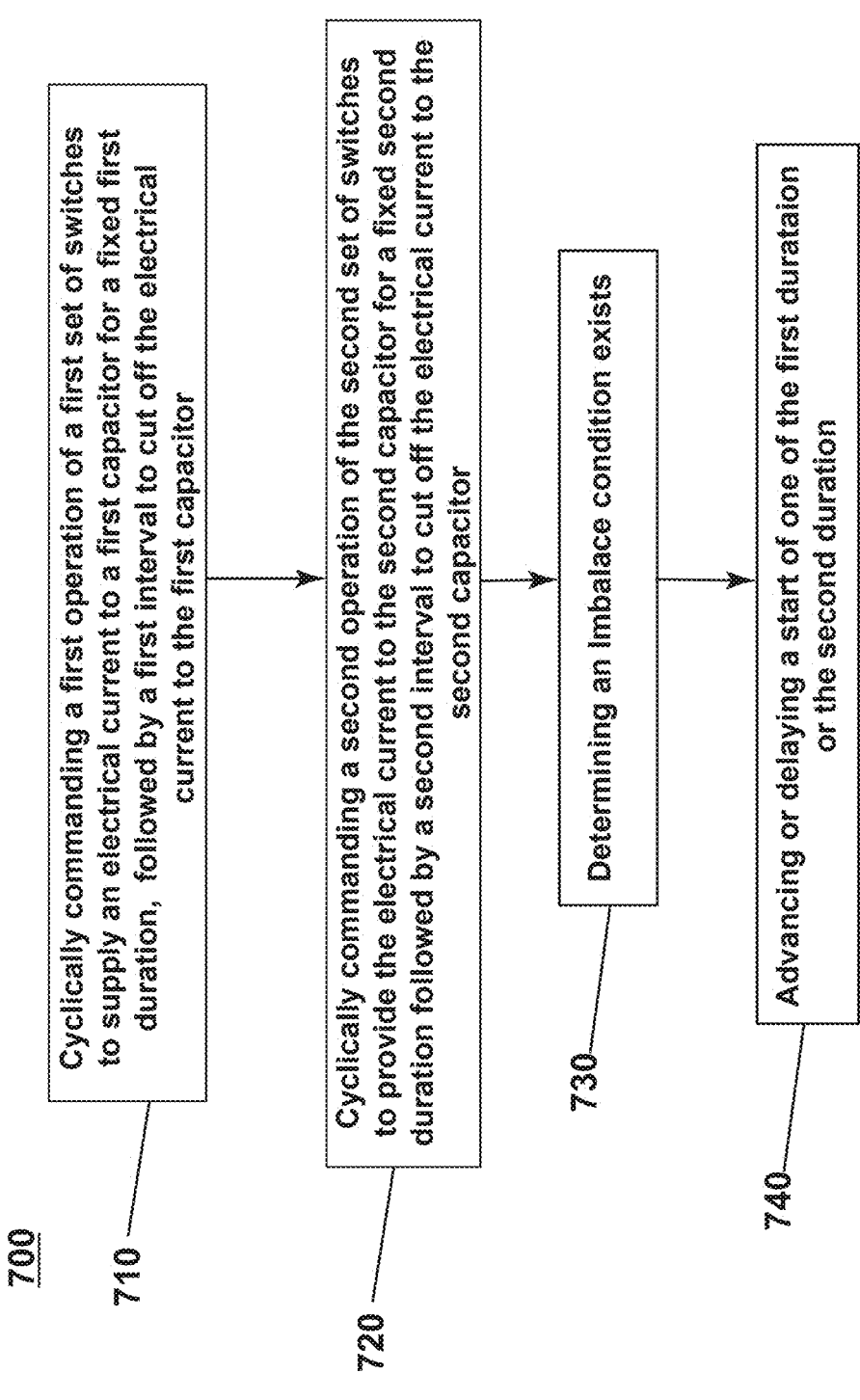

700

710

Cyclically commanding a first operation of a first set of switches to supply an electrical current to a first capacitor for a fixed first duration, followed by a first interval to cut off the electrical current to the first capacitor

720

Cyclically commanding a second operation of the second set of switches to provide the electrical current to the second capacitor for a fixed second duration followed by a second interval to cut off the electrical current to the second capacitor

730

Determining an Imbalace condition exists

740

Advancing or delaying a start of one of the first durataion or the second duration

FIG. 6

POWER CONVERTER AND METHOD OF OPERATING

TECHNICAL FIELD

This disclosure relates to a power converter and a method of operating a power converter, and more specifically to an active gate drive circuit for a power converter.

BACKGROUND

In the electric power industry, direct-current (DC) distribution systems, DC energy sources such as photovoltaic (PV) panels and fuel cells, and DC-based energy storage systems are increasingly deployed in a wide variety of applications that call for increased performance and power densities. In each of these technology areas, DC-DC converters, with the capability to handle high voltages and high currents are required.

Many conventional DC-DC converters employ a set of switches to aid in the power conversion. For example, some DC-DC converters employ silicon carbide (SiC) switches such as SiC metal-oxide-semiconductor field-effect transistors (MOSFETs) or insulated-gate bipolar transistors (IG-BTs) Each switch can be operated or toggled by a respective gate drive circuit which can selectively provide a control signal to a gate terminal of the switch to transition the switch between conducting and non-conducting states.

BRIEF DESCRIPTION OF THE DRAWINGS

A full and enabling disclosure of the present description, including the best mode thereof, directed to one of ordinary skill in the art, is set forth in the specification, which refers to the appended FIGS., in which:

FIG. 6 is a flow diagram of a method of operating a power converter in accordance with various aspects described herein.

DETAILED DESCRIPTION

Figure 1:
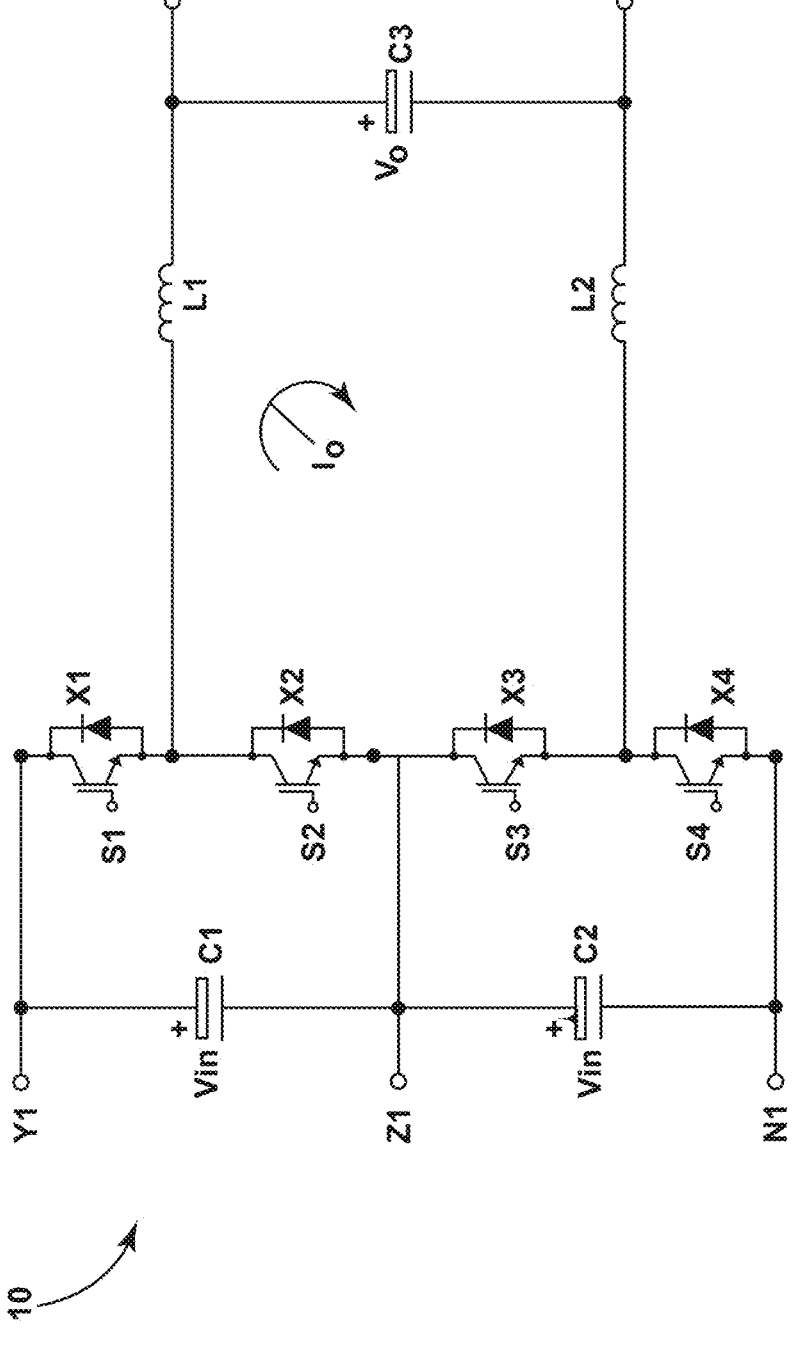
FIG. 1 is a schematic diagram of a conventional power converter.

Aspects of the disclosure can be implemented in any environment, apparatus, or method for in a circuit regardless of the function performed by the circuit.

As used herein, the term "set" or a "set" of elements can be any number of elements, including only one. Additionally, while terms such as "voltage", "current", and "power" can be used herein, it will be evident to one skilled in the art that these terms can be interrelated when describing aspects of the electrical circuit, or circuit operations. Thus, as used herein, the term "power" can be representative of a voltage, a current, or both the voltage and current.

As used herein, the term "duty cycle" refers to a ratio of time a switching device or other component in a circuit is conducting or "ON" compared to the time the switching device or other component is non-conducting or "OFF".

Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to each other. In non-limiting examples, connections or disconnections can be selectively configured to provide, enable, disable, or the like, an electrical connection between respective elements. Non-limiting example power distribution bus connections or disconnections can be enabled or operated by way of switching, bus tie logic, or any other connectors configured to enable or disable the energizing of electrical loads applied to the bus. Additionally, as used herein, "electrical connection" or "electrically coupled" can include a wired or wireless connection. The exemplary drawings are for purposes of illustration only and the dimensions, positions, order and relative sizes reflected in the drawings attached hereto can vary.

As used herein, a "controller" or "module", for example, "controller module", or "switching module" can include a component configured or adapted to provide instruction, control, operation, or any form of communication for operable components to affect the operation thereof. Such controllers or modules can include any known processor, microcontroller, or logic device, including, but not limited to: Field Programmable Gate Arrays (FPGA), a Complex Programmable Logic Device (CPLD), an Application-Specific Integrated Circuit (ASIC), a Full Authority Digital Engine Control (FADEC), a Proportional Controller (PC), a Proportional Integral Controller (PI), a Proportional Derivative Controller (PD), a Proportional Integral Derivative Controller (PID), a hardware-accelerated logic controller (e.g. for encoding, decoding, transcoding, etc.), the like, or a combination thereof. While described herein as comprising separate elements, in non-limiting aspects such controllers and modules can be incorporated on one or more devices including a common device, such as a single processor or microcontroller. Non-limiting examples of such controllers or module can be configured or adapted to run, operate, or otherwise execute program code to effect operational or functional outcomes, including carrying out various methods, functionality, processing tasks, calculations, comparisons, sensing or measuring of values, or the like, to enable or achieve the technical operations or operations described herein. The operation or functional outcomes can be based on one or more inputs, stored data values, sensed or measured values, true or false indications, or the like. While "program code" is described, non-limiting examples of operable or executable instruction sets can include routines, programs, objects, components, data structures, algorithms, etc., that have the technical effect of performing particular tasks or implement particular abstract data types. In another non-limiting example, a controller module, or switching module can also include a data storage component accessible by the processor, including memory, whether transition, volatile or non-transient, or non-volatile memory. Additional non-limiting examples of the memory can include Random Access Memory (RAM), Read-Only Memory (ROM), flash memory, or one or more different types of portable electronic memory, such as discs, DVDs, CD-ROMs, flash drives, Universal Serial Bus (USB) drives, the like, or any suitable combination of these types of memory. In one example, the program code can be stored within the memory in a machine-readable format accessible by the processor. Additionally, the memory can store various data, data types, sensed or measured data values, inputs, generated or processed data, or the like, accessible by the processor in providing instruction, control, or operation to affect a functional or operable outcome, as described herein.

Although various non-limiting aspects are depicted and described herein using various switching devices including MOSFETS or IGBTs or a combination thereof, other aspects are not so limited. Other non-limiting aspects can include any desired switching device that can switch a state between a low resistance state and a high resistance state in response to an electrical signal. For example, the switching devices in various aspects can comprise, without limitation, any desired type of switching element including for example, transistors, gate commutated thyristors, field effect transistors (FETs), IGBTs, MOSFETs, gate turn-off thyristors, static induction transistors, static induction thyristors, or combinations thereof, and combinations thereof.

The exemplary drawings are for purposes of illustration only and the dimensions, positions, order and relative sizes reflected in the drawings attached hereto can vary. Furthermore, the number of, and placement of, the various components depicted in the Figures are also non-limiting examples of aspects associated with the disclosure. For example, while various components have been illustrated with relative position of etc., aspects of the disclosure are not so limited, and the components are not so limited based on their schematic depictions.

A power converter is a power supply or power processing circuit that converts an input voltage waveform into a specified output voltage waveform with controllable frequency, phase, amplitude, or polarity. Power converters can be employed to convert a Direct Current (DC) to an Alternating Current (AC), or from DC to DC, (i.e., DC-DC) or from AC to DC (i.e., AC-DC) as well as the voltage or frequency, or some combination of these. Conventional power converters are often made with one more conversion stages. For example, a DC-AC power converter (e.g., an inverter), can include two stages, a first DC-DC converter to supply a DC voltage, followed by a DC to AC converter which supplies an AC voltage a load. The conversion stages can also be arranged as a step-down or "buck" converter (e.g., a DC-DC power converter which steps down voltage received at its input (supply) to its output (load)). Alternatively, the conversion stages can also be arranged as a "boost" or step-up converter (e.g., a DC-DC power converter that steps up voltage from its input to its output). Still other converters can be arranged to selectively provide buck or boost modes. Multi-level DC-DC converters are commonly employed in numerous applications, such as renewable energy systems, energy storage systems, uninterruptible power systems, and electric vehicles charging systems.

Conventional power converters include an array of semiconductor switches and voltage sources (e.g., capacitors). Controllers associated with the power converters manage an operation thereof by selectively controlling the conduction periods of the switches employed therein. The switches employed by the power converter are typically semiconductor switching devices (e.g., MOSFETs, IGBTs, etc.). The switches are selectively operated to connect an electrical load to the voltage sources.

In combination with the controller, a drive circuit (for example, a gate drive circuit) is conventionally employed to selectively provide a drive signal to a control terminal (e.g., a gate terminal) of each semiconductor switch to control an operation thereof in response to a respective command signal (for example, a pulse-width modulated (PWM) signal) from the controller.

Typically, the controller supplies a constant-frequency PWM command signal (e.g., a gate drive signal) based on a comparison (e.g., using a conventional comparator circuit) of a reference signal with a carrier signal. For example, conventional carrier signals can comprise a sawtooth carrier signal, an inverted sawtooth carrier signal, a triangle carrier signal, or combinations thereof. For example, a typical triangle carrier signal comprises a recurring triangular shape, and the leading and trailing edges of the PWM signal output are modulated. Additionally, the rising and falling edges of the triangle carrier signal are typically symmetric. In some digital applications, (e.g., non-analog), the reference signal is sampled at a regular frequency and the carrier signal is replaced by a counter or timer. To avoid multiple switching transition within a carrier signal cycle, the reference signal is sampled corresponding to the peak and/or valley of the carrier signal.

Typical DC-DC converters employ silicon carbide (SiC) switches such as MOSFETs when it is desirable to withstand a high voltage. As will be appreciated, SiC MOSFETs switch between conducting and non-conducting states relatively faster in comparison to other switches, such as IGBTs, thereby resulting in relatively lower switching losses. Due to the switching frequencies of solid-state switches (e.g., SiC MOSFETS) used in the operation of power electronic circuits, a low frequency current and a high frequency ripple current will flow in the circuit. In conventional power converters, the high-frequency ripple current is an AC component of the output current, that is not dependent on load and is typically considered an undesirable portion of the current flow. To reduce the high-frequency ripple currents, some conventional systems employ various chokes and filters. Such passive filters, are commonly referred to as "LC filters" because they typically employ an inductor (L) and a capacitor (C) arranged to attenuate the ripple current.

As will be described in detail herein, various non-limiting aspects of an apparatus device and method for operating a power converter such as DC-DC power converter are presented. Use of the apparatus and method can result in improved operating efficiency and operational life for an DC-DC power converter. More specifically, the apparatus and methods enable, DC-DC power converters to operate more efficiently, particularly when providing low load or output currents.

A simplified topology of a conventional DC-DC power converter 10 is depicted in FIG. 1. A set of input terminals Y1, Z1, N1 are coupled to a DC bus or other charging device (e.g., a solar panel, not shown). For example, the input terminal Y1 can be coupled to a positive DC bus, the input terminal N1 can be coupled to a negative DC bus, and the input terminal Z1 can be coupled to a neutral bus. The power converter 10 typically includes a set switching devices S1, S2, S3, S4 along with respective freewheeling diodes X1, X2, X3, X4. The power converter 10 also includes an upper input capacitor C1, a lower input capacitor C2, an output capacitor C3, and two output inductors L1, L2. The switches S1-S4 are arranged to define a pair of inner switches S2, S3 and a pair of outer switches S1, S4 as shown. In operation, the switches S1 and S4 are cycled or toggled repeatedly by a controller and a gate drive circuit (not shown) between ON and OFF states (e.g., conducting and non-conducting states, respectively) in accordance with a respective duty cycle of the switches S1-S4. The inner switches S2, S3 operate complementarily with their corresponding adjacent outer switches S1, S4. During balanced loading conditions, (e.g., having an equal voltage across the upper and lower input capacitors C1, C2, the respective duty cycles of the outer switches S1 and S4 can be identical to each other.

During operation, an output voltage Vo is provided across the output capacitor C3. Depending on the respective operating state (e.g., ON or OFF) of the switching devices S1-S4, a charging current Io from output capacitor C3 can flow to the upper input capacitor C1, or the lower input capacitor C2, or both.

In the conventional power converter 10 operation, a balanced power (e.g., an equal capacitor voltage Vin across the upper and lower input capacitors C1, C2) is maintained over time to reduce the stresses on the upper and lower input capacitors C1, C2 and enable an efficient operation of the power converter 10. In order to maintain the power balance or equal voltage over time across the upper and lower input capacitors C1, C2, conventional methods typically manipulate or control a time duration of the charging current Io flow to the upper input capacitor C1 relative to the time duration of charging current Io flow to the lower input capacitor C2. It is generally desirable to operate the power converter 10 in a balanced charging condition. When the charging current Io flow to the upper and lower input capacitors C1, C2 is balanced over time a balanced charging condition or balanced operation is arranged. Typically, such a balanced charging condition or balanced operation is accomplished by lengthening or shortening the relative length or time duration of the ON time of the switches S1-S4.

However, the charging current Io typically includes a non-load dependent AC component (e.g., ripple) Iac, and an average load-dependent DC component Idc, such that the charging current Io is equal to a sum of the AC component Iac and the DC component Idc (Io=Iac+Idc). Additionally, a direction of the charging current Io with respect to the neutral Z1 to the upper input capacitor C1 can be in opposition to a direction of the charging current Io with respect to the neutral Z1 to the lower input capacitor C2. Typically, the AC component Iac of the charging current Io flow to the upper and lower input capacitors C1, C2 is not considered or controlled in conventional methods, and the net charging current Io flow to the upper and lower input capacitors C1, C2 is typically determined based on the DC component Idc of the charging current Io. This conventional technique requires determining the direction of the charging current Io with respect to time, and adjusting the time duration of the charging current Io in each direction to maintain a balanced charging current Io flow over time to the upper and lower input capacitors C1, C2.

For example, the time duration of the charging current Io flow to the upper input capacitor C1 relative to the time duration of the charging current Io flow to the lower input capacitor C2 is typically manipulated by lengthening or shortening a time duration of the charging current Io flow to one of the upper or lower input capacitors C1, C2 to arrange equal voltages across the upper and lower input capacitors C1, C2. More specifically, if an instantaneous voltage at the positive terminal Y1 is lower than the voltage at the negative terminal N1, conventional methods arrange a relatively longer time duration of charging current Io flow to upper input capacitor C1, and/or a relatively shorter time duration of charging current Io flow to the lower input capacitor C2 so that the power converter 10 draws more charge from the positive DC bus at the positive terminal Y1 to balance the power between the positive terminal Y1 and the negative terminal N1. Conversely, if the instantaneous voltage at the positive terminal Y1 is higher than the instantaneous voltage at the negative terminal N1, conventional methods arrange the opposite regulation, with a relatively shorter time duration of charging current Io flow to the upper input capacitor C1, with a relatively longer time duration charging current Io flow to lower input capacitor C2.

These conventional techniques present several challenges in practice, particularly during operation under relatively light electrical loading conditions (e.g., having a relatively low charging current Io). For example, a determination of the net charge flow to the upper and lower input capacitors C1, C2 requires determining the present direction of the charging current Io. At relatively light electrical load conditions, the determined net charge flow to the upper and lower input capacitors C1, C2 may not be accurate because it is very challenging to determine, without delays, a present direction of the charging current Io, for example, due to DC offset and oscillations present in the current measurement.

Accordingly, aspects as disclosed herein are directed to an electrical power converter and control methods therefor. More specifically, aspects as disclosed herein provide a power converter configured to control operation of the switches based on a fixed ON-time duration, while shifting (e.g., advancing or delaying) the ON time duration of the switches with respect to time to achieve a balanced charging condition. In contrast to conventional power converters and control methods, aspects as disclosed herein are not dependent on the direction of the charging current Io. Furthermore, aspects as described herein enable a arranging a balanced operation (e.g., a balanced charging condition or balanced voltage across the upper and lower input capacitors C1, C2) without the need to determine a direction of the charging current Io, which enables balanced operation of the power converter even at very low power levels down to and including a no-load operation.

Figure 2:
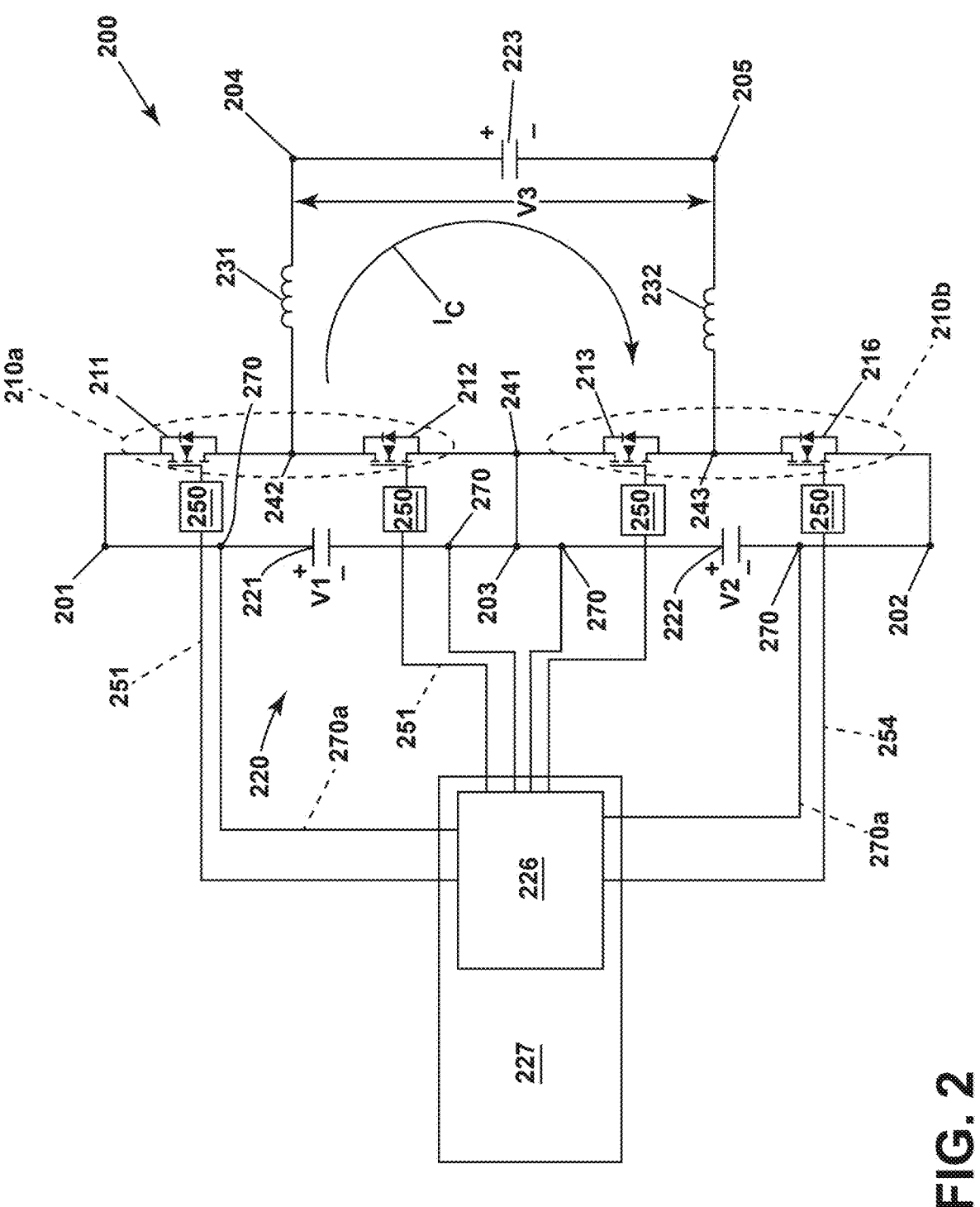
FIG. 2 is a schematic diagram of a power converter, in accordance with various aspects described herein.

Referring now to FIG. 2, a schematic diagram of an exemplary DC-DC power converter 200 for implementing aspects of the disclosure is shown. The power converter 200 can include a set of input terminals such as a first input terminal 201, a second input terminal 202, and a neutral input terminal 203. The power converter 200 can include a first output terminal 204 and a second output terminal 205. A set of input capacitors 220 including a first capacitor 221 and a second capacitor 222 can be coupled electrically in series between the first input terminal 201 and second input terminal 202. The power converter 200 can also include a first set of switches 210a, a second set of switches 210b, a first output terminal 204, a second output terminal 205, and a set of sensors 270. An output capacitor 223, can be coupled in series between the first output terminal 204 and the second output terminal, 205. Optionally, a first inductor 231 can be coupled electrically in series between the first set of switches 210a and the first output terminal 204, and a second inductor 232 can be coupled electrically in series between the second set of switches 210b and the second output terminal 205. The first input terminal 201 can be coupled to a positive DC bus (not shown), the second input terminal 202 can be coupled to a negative DC bus (not shown), and the neutral input terminal 203 can be coupled to a neutral bus (not shown). A first voltage V1 can be defined across the first capacitor 221 (e.g., between the first input terminal 201 and the neutral input terminal 203), a second voltage V2 can be defined across the second capacitor C2 (e.g., between the second input terminal 202 and the neutral input terminal 203). A third voltage (e.g., an output voltage) can be defined across the output capacitor 223 (e.g., between the first output terminal 204 and the second output terminal 205).

The first set of switches 210a can include a first switch 211 and a second switch 212. The second set of switches 210b can include a third switch 213 and a fourth switch 214. The first switch 211, second switch 212, third switch 213, and fourth switch 214, can hereinafter collectively be referred to as switches 211-214. Additionally, for ease of reference, the first switch 211 and fourth switch 214 can herein collectively be referred to outer switches 211, 214, and the second switch 212 and third switch 213 can herein collectively be referred to as inner switches 212, 213. Each of the switches 211-214 can also include a respective gate drive circuits 250. For example, a respective gate drive circuit 250 can be communicatively coupled to each of the switches 211-214.

A respective gate drive circuit 250 can be communicatively coupled to a gate terminal of each of the switches 211-214. In non-limiting aspects, a modulator 227 can be communicatively coupled to the gate drive circuits 250. In the non-limiting aspect illustrated in FIG. 2, the modulator 227 is depicted as a part of the power converter 200. In other aspects, the modulator 227 can be disposed remote from the power converter 200. The modulator 227 can include a controller 226 configured to control operations of the switches 211-214 to facilitate operation of the power converter 200. The controller 226 can include hardware elements such as a specially programmed general-purpose computer, an electronic processor such as a microprocessor, a digital signal processor, an FPGA, a microcontroller, or combinations thereof. Further, the controller 226 can include input/output (I/O) ports and a storage medium, such as an electronic memory. Various examples of the microprocessor include, but are not limited to, a reduced instruction set computing (RISC) architecture type microprocessor or a complex instruction set computing (CISC) architecture type microprocessor. Further, the microprocessor can be a single-core type or multi-core type. Alternatively, the controller 226 can be implemented using hardware elements such as circuit boards with processors, logic gates, or as software running on a processor such as a personal computer (PC), or a microcontroller.

The controller 226 can be communicatively coupled to the gate drive circuits 250 and configured to selectively control an operation of the switches 211-214. For example, the set of gate drive circuits 250 can receive a command signal (e.g., a PWM command signal) from the controller 226. In non-limiting aspects, the first set of switches 210a can be arranged receive a first command signal 251 from the controller 226, and the second set of switches can be arranged to receive a second command signal 254 from the controller 226. The controller 226 can be further communicatively coupled to the set of sensors 270.

The set of sensors 270 can be configured to detect, measure, or otherwise sense a respective electrical parameter (e.g., a voltage) associated with an operation of the power converter 200. Each sensor 270 can comprise any desired conventional sensor type including, but not limited to, a voltage sensor, a current sensor, or combinations thereof. Each sensor 270 can be arranged to provide a respective sensor signal 270a (e.g., a voltage signal) to the controller 226 indicative of a value of the respective electrical parameter. The value of the respective electrical parameter can be, directly or indirectly, at least partially indicative of a first voltage V1 across the first capacitor 221, or a second voltage V2 across the second capacitor 222, or both. For example, a particular sensor 270 can provide to the controller 226 a first respective sensor signal 270a indicative of the first voltage V1 across the first capacitor 221, and another sensor 270 can provide to the controller 226 a second respective sensor signal 270a indicative of the second voltage V2 across the second capacitor 222.

The controller 226 can be communicatively coupled with the set of sensors 270 via a suitable wired or wireless communication line. The controller 226 can be configured to determine the value of at least one respective electrical parameter based on the respective sensor signal 270a. The controller 226 can be configured to, based at least in part on the respective sensor signals 270a, selectively activate or energize the first set of switches 210a, or the second set of switches 210b, or both. It will be appreciated that the set of sensors 270 can include any desired number of sensors 270.

For ease of description and understanding, first set of switches 210a and the second set of switches 210b are depicted in the exemplary non-limiting aspect of FIG. 2 as each having two switches. However, aspects having any number of switches, including greater than two switches in the first set of switches 210a and the second set of switches 210b are also contemplated. Moreover, the switches 211-214 are discussed and described herein as comprising SiC MOSFETs. Other aspects are not so limited, and the power converter 200 can include other types of switches as desired. Other non-limiting examples of the switches 211-214 can include transistors, gate commutated thyristors, FETs, MOSFETs, IGBTs, gate turn-off thyristors, static induction transistors, static induction thyristors, or combinations thereof. Furthermore, materials used to form the switches 211-214 can include, but are not limited to, silicon (Si), germanium (Ge), SiC, gallium nitride (GaN), or combinations thereof.

As will be appreciated, a SiC switch module (e.g., a MOSFET) can include more than one switch. Therefore, in some non-limiting aspects, two such SiC modules can be used to form the power converter 200 of FIG. 2. By way of example, a first SiC switch module (not shown) can comprise the first switch 211 and second switch 212, and a second SiC switch module (not shown), can comprise the third switch 213 and the fourth switch 214. It will be appreciated that other types of switch modules can also be used without limiting the scope of the present disclosure.

As depicted in the non-limiting aspect of FIG. 2, the first switch 211, the second switch 212, the third switch 213, and the fourth switch 214 can be coupled electrically in series. More particularly, the first switch 211, the second switch 212, the third switch 213, and the fourth switch 214 can be coupled electrically in series such that a source terminal of the first switch 211 is connected to a drain terminal of the second switch 212, a source terminal of the second switch 212 is connected to a drain terminal of the third switch 213, and a source terminal of the third switch 213 is connected to a drain terminal of the fourth switch 214.

Figure 3:
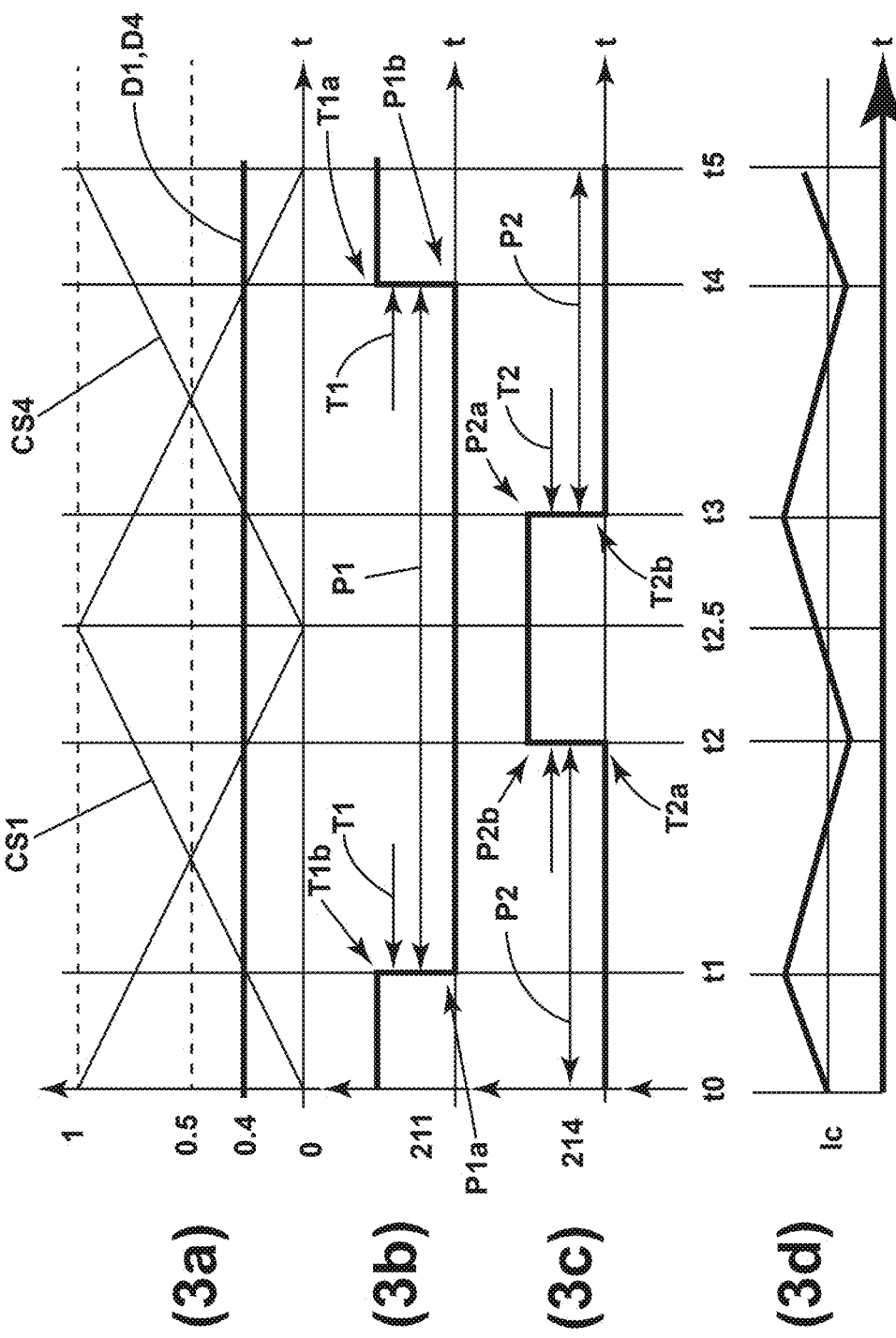
FIG. 3 is a graphical representation of a set of waveforms, designated 3a-3d, representing an exemplary operation of the power converter of FIG. 2 under a balanced condition, in accordance with various aspects described herein.

Further, the first switch 211 is operatively coupled to the first input terminal 201 and the fourth switch 214 is operatively coupled to the second input terminal 202. More particularly, as depicted in FIG. 3, a drain terminal of the first switch 211 can be connected to the first input terminal 201, while a source terminal of the fourth switch 214 can be connected to the second input terminal 202.

Additionally, a first node 241 is provided as an interconnection point of the second switch 212 and the third switch 213. The first node 241 is communicatively coupled to the neutral input terminal 203. Also, a second node 242 is provided as an interconnection point of the first switch 211 and the second switch 212. Moreover, a third node 243 is provided as an interconnection point of the third switch 213 and the fourth switch 214.

In non-limiting aspects, the first inductor 231 is electrically coupled in series between the second node 242 and the first output terminal 204. The second inductor 232 is electrically coupled in series between the third node 243 and the second output terminal 205. Additionally, the first capacitor 221 is electrically connected between the first input terminal 201 and the neutral input terminal 203. Also, the second capacitor 222 is electrically connected between the second input terminal 202 and the neutral input terminal 203.

In operation, the controller 226 can be configured to selectively command an operation of one or more of the switches 211-214 in a conducting state (e.g., an ON state) and operate the remaining switches in a non-conducting state (e.g., an OFF state). As will be appreciated, the switches 211-214 operated in the conducting state allow an electrical current to pass through, while the switches 211-214 operated in the non-conducting state block a flow of the electrical current therethrough. In non-limiting aspects, the controller 226 can be configured to cyclically command a first operation of the first set of switches 210a (e.g., based on a predetermined duty cycle). Additionally, the controller 226 is further configured to cyclically command a second operation of the second set of switches 210b (e.g., based on a predetermined duty cycle).

Based on the respective operating state (e.g., an ON state or OFF state) of the switches 211-214, a charging current Ic can be provided from the third capacitor C3. As will be described in more detail herein, the charging current Ic can flow in a first direction (with respect to the neutral input terminal 203) to the first capacitor 221 for a fixed first duration, or in a second direction (with respect to the neutral input terminal 203) to the second capacitor 222 for a fixed second duration.

The controller 226 can be configured independently command the first operation or second operation of the switches 211-214 respectively, in the conducting state or the non-conducting state by selectively providing the first command signal 251 or the second command signal 254 to the respective gate drive circuit 250 of each switch 211-214 to cause the gate drive circuit 250 to trigger a respective operation of the switches 211-214. For, example, the controller 226 can be configured to selectively supply a respective first command signal 251 to the first set of switches 210a. Additionally, the controller 226 can be configured to selectively supply the respective second command signal 254 to the second set of switches 210b.

In the non-limiting aspect of FIG. 2, the switches 211-214 are depicted as N-channel SiC MOSFETs. Accordingly, to operate any of the switches 211-214 in the conducting state, it is desirable to supply a respective first or second command signal 251, 254 having a higher magnitude (H) to a corresponding gate terminal. It can be noted that the first or second command signal 251, 254 having the higher magnitude is representative of a respective first or second command signal 251, 254 having a magnitude that is greater than a magnitude of a signal provided to a corresponding source or emitter terminal. Similarly, to operate any of the switches 211-214 in the non-conducting state, it is desirable to supply the respective first or second respective first or second command signal 251, 254 having a lower magnitude (L) to the corresponding gate terminal. It can be noted that the respective first or second command signal 251, 254 having the lower magnitude is representative of a first or second command signal 251, 254 having a magnitude that is lower than a magnitude of a signal provided to a corresponding source or emitter terminal. Moreover, it can be noted that if P-channel SiC MOSFETs are used as the switches 211-214, the levels of the respective first and second command signals 251, 254 can be interchanged.

Accordingly, to operate any of the switches 211-214 in the conducting state, the controller 226 can be configured to supply a respective command signal 251, 254 via the respective gate drive circuit 250 having the higher magnitude to the respective gate terminals of the switches 211-214. Similarly, to operate any of the switches 211-214 in the non-conducting state, the controller 226 can be configured to supply the command signal 251, 254 via the gate drive circuit 250 having the lower magnitude (L) to the respective gate terminals of the switches 211-214.

The controller 226 can also receive one or more sensor signals 270a from the set of sensors 270, indicative of a value of one or more sensed electrical parameters (e.g., a voltage). The controller 226 can determine the magnitude or value of the one or more electrical parameters based on the respective sensor signal 270a. For example, the controller 226 can receive the sensor signal 270a from a sensor 270, (e.g., a voltage sensor) indicative of the magnitude or value of the first voltage V1 across the first capacitor 221, and can further receive another sensor signal 270a from another sensor 270, (e.g., a voltage sensor) indicative of the magnitude or value of the second voltage V2 across the second capacitor 222. The controller 226 can be configured to determine the magnitude of the first voltage V1 and the magnitude of the second voltage V2 based on the sensor signals 270a from the sensors 270. The controller 226 can be further configured to determine a difference between the magnitude of the first voltage V1 and the magnitude of the second voltage V2.

The controller 226 can further determine when an imbalance condition exists with respect to the first and second capacitors 221, 222. For example, the controller 226 can determine an imbalance condition exists based on the magnitude of the first voltage V1 and the magnitude of the second voltage V2, or a difference therebetween. In one non-limiting instance, the controller 226 can be configured to determine an imbalance condition exists when the magnitude of the first voltage V1 across the first capacitor 221 does not equal a magnitude of the second voltage V2 across the second capacitor 222. In another non-limiting instance, the controller 226 can be configured to determine an imbalance condition exists when a difference between the magnitude of the first voltage V1 across the first capacitor 221 and the magnitude of the second voltage V2 across the second capacitor 222 is greater than a predetermined range or a predetermined magnitude.

In the event the controller 226 determines an imbalance condition exists, the controller 226 can be configured to cause phase shift or timing advance of the first command signal 251. For example, in non-limiting aspects, based on a determination that an imbalance condition exists, the controller 226 can be configured to advance the first operation of the first set of switches 210a by supplying the first command signal 251 to the first set of switches 210a at an earlier point in time than would have been supplied during a balanced charging condition. The magnitude (e.g., time) of the advance to the first operation of the first set of switches 210a can be based on (e.g., proportional to) a magnitude of a difference between the first voltage V1 and the second voltage V2.

Alternatively, in non-limiting aspects, based on a determination that an imbalance condition exists, the controller 226 can be configured to delay the first operation of the first set of switches 210a by supplying the first command signal 251 to the first set of switches 210a at a later point in time than would have been supplied during a balanced charging condition. The magnitude (e.g., time) of the delay to the first operation of the first set of switches 210a can be based on (e.g., proportional to) a magnitude of a difference between the first voltage V1 and the second voltage V2.

Additionally, or alternatively, in non-limiting aspects, based on a determination that an imbalance condition exists, the controller 226 can be configured to advance the second operation of the second set of switches 210b by supplying the second command signal 254 to the second set of switches 210b at an earlier point in time than would have been supplied during a balanced charging condition. The magnitude (e.g., time) of the advance to the second operation of the second set of switches 210b can be based on or proportional to a magnitude of the difference between the first voltage V1 and the second voltage V2.

In other non-limiting aspects, based on a determination that an imbalance condition exists, the controller 226 can be configured to delay the second operation of the second set of switches 210b by supplying the second command signal 254 to the second set of switches 210b at a later point in time than would have been supplied during a balanced charging condition. The magnitude (e.g., time) of the delay to the second operation of the second set of switches 210b, can be based on or proportional to a magnitude of the difference between the first voltage V1 and the second voltage V2.

A more detailed example of an exemplary operation of an aspect of the power converter 200 of FIG. 2, during a balanced charging condition (e.g., with respect to the first and second capacitors 221, 222), will be discussed with simultaneous reference to FIGS. 2-3 and 5. Additionally, an example of an exemplary operation of the aspect of the power converter 200 of FIG. 2, during an imbalanced charging condition (e.g., with respect to the first and second capacitors 221, 222), will then be discussed with simultaneous reference to FIGS. 2 and 4.

FIG. 3 illustrates a set of timing diagrams (designated as diagrams 3a-3d) depicting concurrent waveforms associated with the exemplary operation of the power converter 200 of FIG. 2 under a balanced operating condition (e.g., with respect to the first and second capacitors 221, 222) over time. Diagram 3a illustrates common respective duty cycles D1, D4 (illustrated as respective reference signals D1, D4) of the outer switches 211, 214 of less than or equal to 0.5 (e.g., 0.4). Diagram 3b depicts a binary operating state (e.g., ON/OFF) of the first switch 211 over time with respect to diagram 3a. Diagram 3c depicts the binary operating state (e.g., ON/OFF) of the fourth switch 214 over time with respect to diagram 3a. Diagram 3d depicts the magnitude of the charging current Ic with respect to time based on the operation of the outer switches 211, 214 as indicated in diagrams 3a-3c.

The duty cycles D1, D4 depicted in diagram 3a can be predetermined duty cycles. While the particular example depicted in diagram 3a depicts the outer switches 211, 214 having equal duty cycles of less than 0.5, other aspects are not so limited and it is contemplated that the outer switches 211, 214 can be arranged having any desired respective duty cycle (including greater than 0.5 and equal to 0.5), and the respective duty cycles need not be equal. Additionally, diagram 3a depicts respective carrier signals designated as a first carrier signal CS1, and a second carrier signal CS4 with the first and second carrier signals CS1, CS4 corresponding to the outer switches 211, 214, respectively. The respective first and second carrier signals CS1, CS4 are 180-degrees interleaved and are symmetrical with respect to each other. The controller 226 can supply the first and second command signal 251, 254 to the outer switches 211, 214, respectively, based on a comparison (e.g., using a conventional comparator circuit) of the duty cycle reference signal D1, D4 with the interleaved first and second carrier signal CS1, CS4, respectively. While the example shown in diagram 3a depicts the first and second carrier signals CS1, CS4 as 180-degree interleaved triangular carrier signals, it will be appreciated that other aspects are not so limited, and other carrier signal waveforms can be employed, such as sawtooth, inverted sawtooth, and the like, and can be interleaved at any desired phase orientation. In still other aspects, a non-analog duty cycle reference signal D1, D4 can be sampled by the controller 226 at a regular frequency, and the first and second carrier signals CS1, CS4 can be replaced by a counter or timer (not shown) without departing from the scope of the disclosure.

In operation, the controller 226 is configured to selectively command an operation of one or more of the switches 211-214 in a conducting state (e.g., an ON state) and operate the remaining switches in a non-conducting state (e.g., an OFF state). In non-limiting aspects, the controller 226 can be configured to cyclically command a first operation of the first set of switches 210a (e.g., based on the respective duty cycle D1) and further configured to cyclically command a second operation of the second set of switches 210b (e.g., based on the respective duty cycle D4).

For example, the first operation can include cyclically operating the first switch 211 based on the duty cycle D1, in a conducting (ON) state for a fixed first duration T1, followed by a predetermined first interval P1 in a non-conducting (OFF) state. The first duration T1 includes a start point T1a, and an end point T1b, with the duration of T1 being an elapsed time between T1a and T1b. Similarly, the first interval P1 includes a start point P1a, and an end point P1b, with the duration of P1 being an elapsed time between P1a and P1b. Conversely, the first operation can include cyclically operating the second switch 212 in a non-conducting state for the first duration T1 followed by a conducting state for the predetermined first interval P1. In the particular instance illustrated, the first switch 211 is shown in the conducting state (e.g., during a first duration T1) at t=t0 on the horizontal axis. At the end point T1b, where t=t1 on the horizontal axis, the first switch 211 is toggled to the non-conducting state at the start point P1a to begin the first interval P1. Then, at the end point P1b, the first interval P1 ends where t=t4 on the horizontal axis, and the first switch 211 is cycled back to the conducting state at the start point T1a to begin the first duration T1.

Similarly, the second operation can include cyclically operating the fourth switch 214 based on the predetermined duty cycle D4, in a conducting (ON) state for a fixed second duration T2, followed by a predetermined second interval P2 in a non-conducting (OFF) state. The second duration T2 includes a start point T2a, and an end point T2b, with the duration of T2 being an elapsed time between T2a and T2b. Similarly, the second interval P2 includes a start point P2a, and an end point P2b, with the duration of P2 being an elapsed time between P2a and P2b. Conversely, the second operation can include cyclically operating the third switch 213 in a non-conducting (OFF) state for the second duration T2, followed by the predetermined second interval P2. For example, the fourth switch 214 is shown in the non-conducting state (i.e., during the second interval P2) at t=t0 on the horizontal axis until reaching the start point at T2a, where t=t2 on the horizontal axis, the fourth switch 214 is toggled to the conducting state for the second duration T2, which ends at t=t3 on the horizontal axis, when the fourth switch 214 is cycled back to the non-conducting state at the start point P2a for the second interval P2. The fixed first duration T1 and fixed second duration T2 can be based on predetermined respective duty cycles of the first and second sets of switches 210a, 210b.

Figure 5:
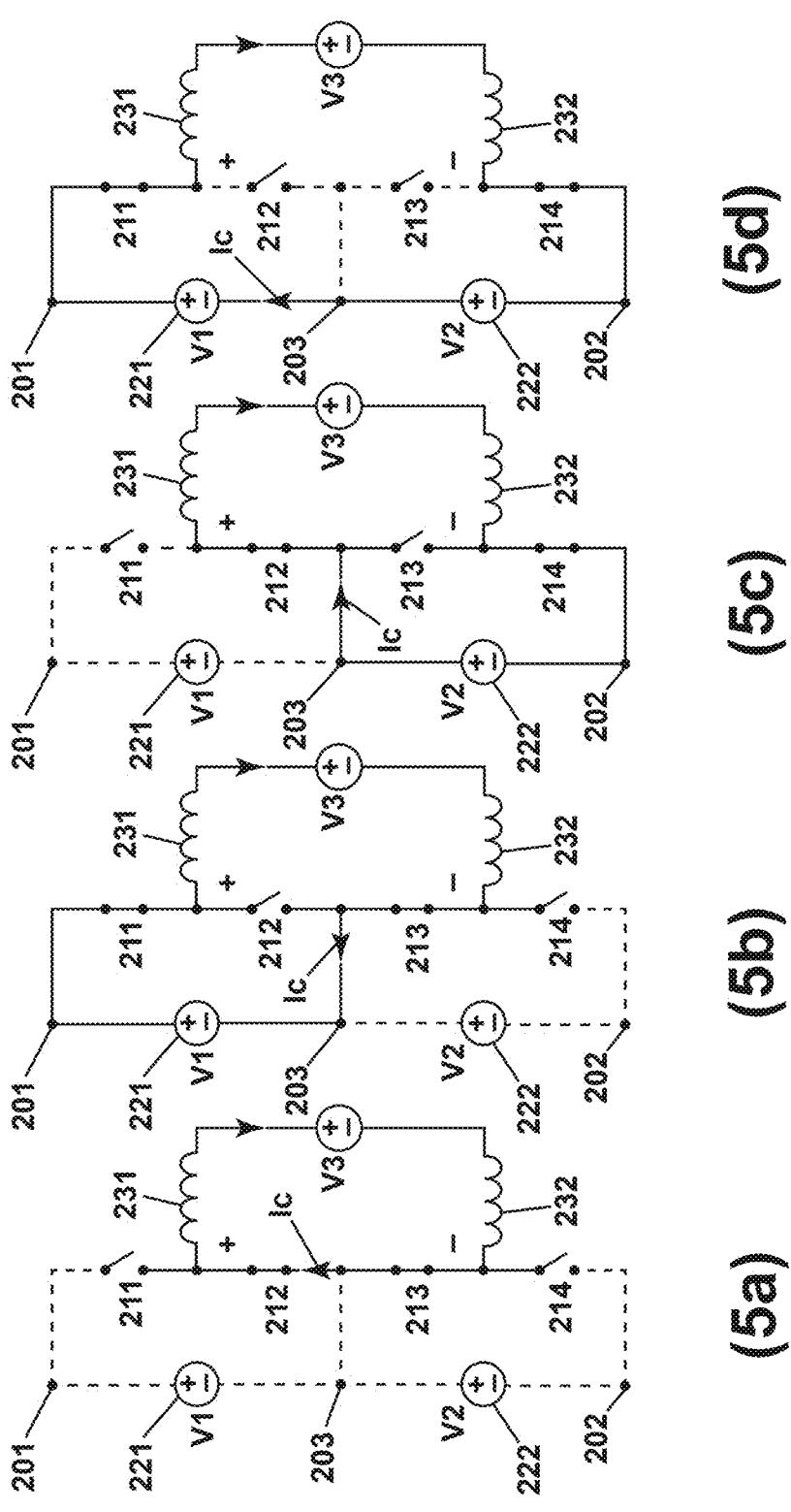
FIG. 5 is a set of simplified schematic diagrams, designated 5a-5d, depicting possible stages of operation of the power converter of FIG. 2, in accordance with various aspects described herein.

FIG. 5 depicts four possible operating stages of the power converter 200 of FIG. 2, with corresponding equivalent circuits, illustrated as operating stages: (5a) 212-213, (5b) 211-213, (5c) 212-214, and (5c) 211-214), where the corresponding numbers denote which of the switches 211-214 are turned ON during the respective operating stage (5a) 212-213, (5b) 211-213, (5c) 212-214, and (5c) 211-214). For ease of description and understanding, in FIG. 5 the controller 226 is omitted for clarity, the charging current Ic polarity is depicted as positive, the first and second capacitors 221, 222 and output capacitor 223 are depicted as respective ideal voltage sources, providing the respective first and second voltages V1, V2.

In operation, the outer switches 211, 214 are cycled between ON and OFF states responsive to the respective first command signal 251 or second command signal 254 provided by the controller 226 (shown in FIG. 2) in accordance with the respective duty cycle (e.g., 40%) indicated by the duty cycle reference signals D1, D4 (shown in FIG. 3). As illustrated in diagram 3a of FIG. 3, a timing of the first command signal 251 and second command signal 254 can be based on the comparison by the controller 226 of the respective reference signals D1, D4 of the outer switches 211, 214 with the first and second carrier signals, designated CS1, CS4. In non-limiting aspects, the first (outer) switch 211 can be operated complementarily to the second (inner) switch 212. For example, the first switch 211 can be cycled between ON and OFF states responsive to the respective first command signal 251 (FIG. 2), and the second switch 212 can be operated responsive to a NOT or opposite of the first command signal 251. Likewise, in non-limiting aspects, the fourth (outer) switch 214 can be operated complementarily to the third (inner) switch 213. For example, the fourth switch 214 can be cycled between ON and OFF states responsive to the respective first command signal 251 (FIG. 2), and the third switch 213 can be operated responsive to a NOT or opposite of the first command signal 251. Consequently, in non-limiting aspects, the inner switches 212, 213 can be actuated complementarily to their corresponding adjacent outer switches 211, 214.

With simultaneous reference to FIGS. 3 and 5, starting at a time reference equal to zero (e.g., at t=t0 on the horizontal axis), the first switch 211 is in an ON or conducting state and the fourth switch 214 is in an OFF or non-conducting state, corresponding to operating stage (5b) 211-213. With increasing time, when a rising edge of the first carrier signal CS1 is equal to, or crosses, the reference signal D1, (e.g., at t=t1), the controller 226 supplies the first command signal 251 to trigger the first switch 211 to toggle to an OFF or non-conducting state, thereby transitioning the power converter 200 to operating stage (5a) 212-213. Next, with increasing time, when a falling edge of the second carrier signal CS4 is equal to, or crosses, the reference signal D4 (e.g., at t=t2), the controller 226 supplies the second command signal 254 to trigger the fourth switch 214 to toggle to an ON or conducting state, transitioning the power converter 200 to operating stage (5c) 212-214.

With increasing time, as the rising edge of the second carrier signal CS4 is again equal to, or crosses, the reference signal D4 (e.g., at t=t3), the controller 226 supplies the second command signal 254 to trigger the fourth switch 214 to toggle to an OFF or non-conducting state, transitioning the power converter 200 back to operating stage (5a) 212-213.

Next, with increasing time, as the falling edge of the first carrier signal CS1 is again equal to, or crosses, the reference signal D1 (e.g., at t=t4), the controller 226 supplies the first command signal 251 to trigger the first switch 211 to toggle to an ON or conducting state, transitioning the power converter 200 back to operating stage (5b) 211-213.

However, in operation, the controller 226 (FIG. 2) also is also configured to determine when an imbalance condition exists with respect to the first and second capacitors 221, 222. For example, the controller 226 can determine an imbalance condition exists when magnitude of the first voltage V1 across the first capacitor 221 does not equal a magnitude of the second voltage V2 across the second capacitor 222, or when a difference between the magnitude of the first voltage V1 across the first capacitor 221 and the magnitude of the second voltage V2 across the second capacitor 222 is greater than a predetermined range or magnitude. When the controller 226 determines an imbalance condition exists, the controller 226 is configured to advance or delay a start of at least one of the first interval T1 or the second interval T2, or both. In non-limiting aspects, the advance or delay of the start of at least one of the first interval T1 or the second interval T2, or both, can include a phase shift (e.g., a timing advance or timing delay) of the first or second carrier signals CS1, CS4, or both, such that the first and second carrier signals CS1, CS4 are asymmetric with respect to each other. This phase shift of the first carrier signal CS1, or the second carrier signal CS4, or both, results in the controller 226 supplying the first command signal 251 or second command signal 254, or both, at one of an earlier or later point in time) than would be supplied under a balanced charging condition, without need to modify a length of the first time duration T1 or the second time duration T2. The magnitude (e.g., time) of the advance or delay can be based on (e.g., proportional to) a magnitude of the difference between the first voltage V1 and the second voltage V2.

An example of an exemplary operation of the aspect of the power converter 200 of FIG. 2, during an imbalanced charging condition (e.g., with respect to the first and second capacitors 221, 222), will now be discussed with simultaneous reference to FIG. 4. For purposes of compact description, a particular instance of an imbalanced charging condition in which the second voltage V2 is less than the first voltage V1 will be described by way of one non-limiting example. Other aspects are not so limited, and it is contemplated that in other instances, the imbalanced charging condition can be based on other operating conditions such as the first voltage V1 being less than the second voltage V2.

Figure 4:
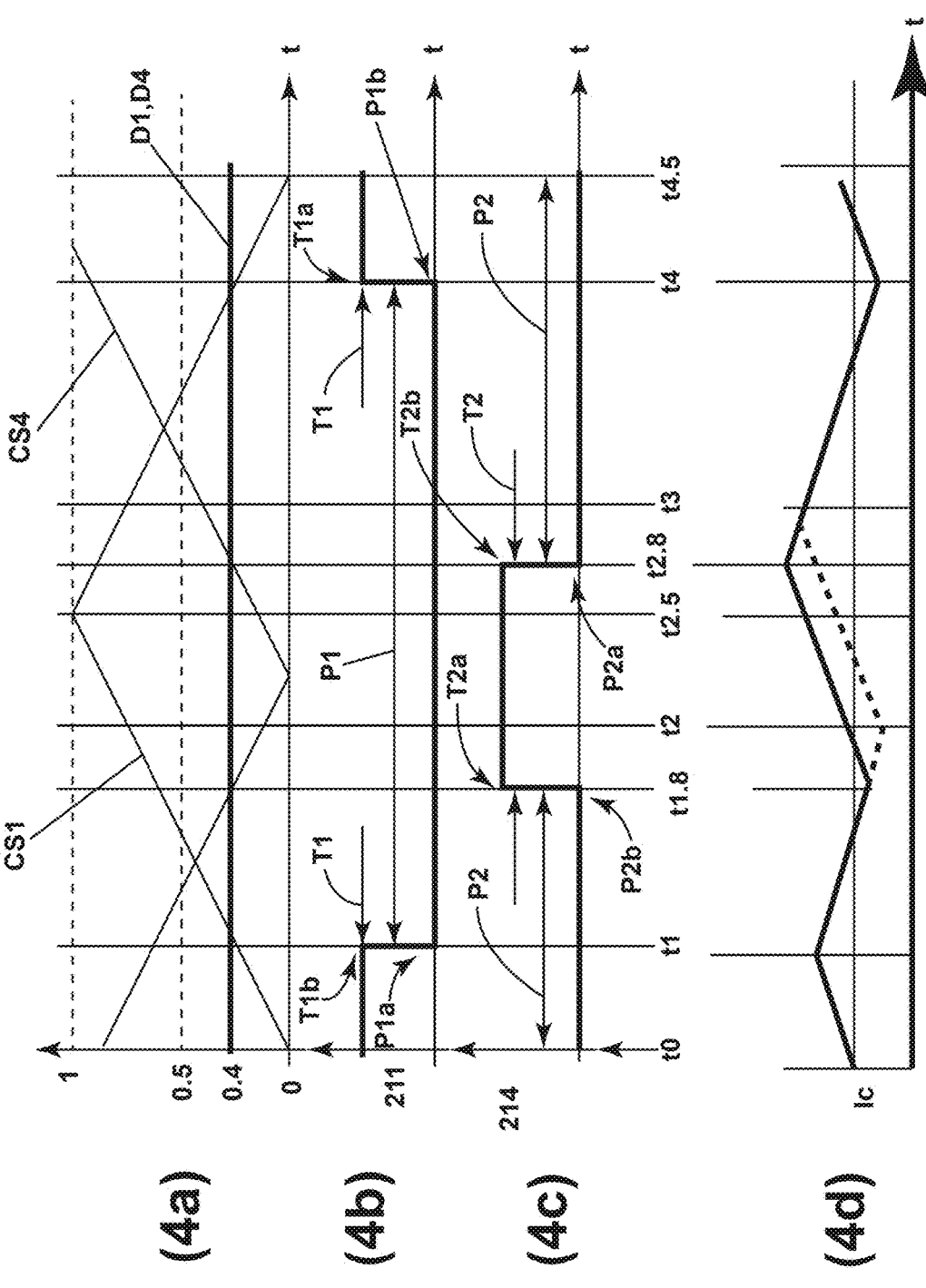
FIG. 4 is a graphical representation of a set of waveforms, designated 4a-4c, representing an exemplary operation of the power converter of FIG. 2 under an imbalanced condition, in accordance with various aspects described herein.

FIG. 4 illustrates a set of timing diagrams (designated diagrams 4a-4e) depicting concurrent waveforms associated with the exemplary operation of the power converter 200 of FIG. 2. The diagrams 4a-4d are similar to the diagrams 3a-3d depicted in FIG. 3. However, while the diagrams 3a-3d of FIG. 3 depict waveforms associated with the operation of the power converter 200 of FIG. 2 under balanced conditions, in contrast, diagrams 4a-4d of FIG. 4 depicts the waveforms associated with the operation of the power converter 200 of FIG. 2 under an imbalanced condition with respect to the first and second capacitors 221, 222 over time, for example, when the second voltage V2 is less than the first voltage V1.

Diagram 4*a* illustrates the common respective duty cycles (indicated by the reference signals D1, D4) of the outer switches 211, 214 of less than or equal to 0.5 (e.g., 0.4). Diagram 4*b* depicts the binary operating state (e.g., ON/OFF) of the first switch 211 over time with respect to diagram 4*a*. Diagram 4*c* depicts the binary operating state (e.g., ON/OFF) of the fourth switch 214 over time with respect to diagram 4*a*. Diagram 4*d* depicts the magnitude of the charging current Ic with respect to time based on the operation of the outer switches 211, 214 as indicated in diagrams 4*a*-4*c*, in response to an imbalance condition. For purposes of clarity and ease of understanding, the charging current Ic waveform with respect to time based on the operation of the outer switches 211, 214 when operating in a balanced condition (as illustrated in diagram 3*d* of FIG. 3) is overlayed on the charging current waveform Ic of diagram 4*d* as a dashed line.

While the particular example illustrated in diagram 4*a* depicts the outer switches 211, 214 having equal duty cycles of less than 0.5, other aspects are not so limited and the outer switches 211, 214 can be arranged having any desired respective duty cycle (including greater than 0.5 and less than 0.5), and the respective duty cycles need not be equal. Additionally, while diagram 4*a* depicts the respective first and second carrier signals CS1, CS4 corresponding to the outer switches 211, 214, respectively, it will be appreciated that the controller 226 can supply the first and second command signal 251, 254 to the outer switches 211, 214, respectively, based on a comparison (e.g., using a conventional comparator circuit) of the reference signal D1, D4 with the interleaved first and second carrier signal CS1, CS4, respectively. Notably, while the exemplary instance depicted in diagram 3*a* of FIG. 3, depicts a balanced operating condition with the first and second carrier signals CS1, CS4 being symmetric with respect to each other, in contrast, the instance depicted in diagram 4*a* of FIG. 4, depicts an imbalance operating condition wherein the controller 226 (FIG. 2) is configured to one of advance or delay one of the first carrier signal CS1, the second carrier signal CS4, or both. As such, when an imbalance condition exists the first and second carrier signals CS1, CS4 are arranged asymmetric with respect to each other.

For example, as shown in diagram 4*a* of FIG. 4, the carrier signal CS4 intersects the duty cycle reference signal D4 at time t=t2 on the horizontal axis and triggers the controller 226 to supply the second command signal 254 to the fourth switch 214, the exemplary instance depicted in diagram 4*a* of FIG. 4 illustrates a phase shift of the second carrier signal CS4. More specifically, in the exemplary instance of a determination by the controller 226 of an imbalance condition (e.g., the first voltage V1 being greater than the second voltage V2), the controller 226 alters (e.g., shifts earlier in time) the second carrier signal CS4 to cause the second carrier signal CS4 to intersect the reference signal D4 earlier in time (e.g. at t1.8 on the horizontal axis) than in the prior example of diagram 3*a* under balanced conditions (e.g., at t=t2). The magnitude (e.g., time) of the phase shift of the second carrier signal CS4 can be based on or proportional to a magnitude of the difference between the first voltage V1 and the second voltage V2. While the particular example depicted in FIG. 4 illustrates an exemplary phase shift of the second carrier signal CS4 when the first voltage V1 is greater than the second voltage V2, other aspects are not so limited. For example, aspects are contemplated wherein the controller 226 delays or phase shifts the second carrier signal CS4 to intersect the reference signal D4 later in time based on a determination that the first voltage V1 is less than the second voltage V2. Additionally, or alternatively, in other aspects the controller can similarly advance or delay the first carrier signal CS1 to intersect the duty cycle reference signal D1 earlier or later in time based on a difference between the first voltage V1 and the second voltage V2. The magnitude (e.g., time) of the phase shift of the first carrier signal CS1 can be based on or proportional to a magnitude of the difference between the first voltage V1 and the second voltage V2.

The phase shift of the second carrier signal CS4 depicted in diagram 4*a* can further cause the controller 226 to advance or otherwise supply the second command signal 254 to operate the fourth switch 214 earlier in time than under a balanced condition, without modifying the duration of the second duration T2.

While the example shown in diagram 4*a* depicts the first and second carrier signals CS1, CS4 as interleaved triangular carrier signals, it will be appreciated that other aspects are not so limited, and other carrier signals can be employed, such as sawtooth, inverted sawtooth, and the like, and can be interleaved at any desired phase orientation. In still other aspects, a non-analog duty cycle reference signal D1, D4 can be sampled by the controller 226 at a regular frequency, and the first and second carrier signals CS1, CS4 can be replaced by a counter or timer (not shown). Additionally, while non-limiting aspects are described herein, for ease of description and understanding, with reference to a duty cycle of less than or equal to 0.5, other aspects are not so limited, and the power converter 200 can operate the first set of switches 210*a* and the second set of switches 210*b* using any desired duty cycle, including equal to, greater than, or less than 0.5, without departing from the scope of the disclosure.

As shown in diagram 4*b*, based on the predetermined duty cycle, the first switch 211 is cyclically operated in the conducting (ON) state for the first duration T1, followed by a first interval P1 in the non-conducting (OFF) state. The first duration T1 includes the start point T1*a*, and the end point T1*b*, with the duration of T1 being an elapsed time between T1*a* and T1*b*. Similarly, the first interval P1 includes the start point P1*a*, and the end point P1*b*, with the duration of P1 being an elapsed time between P1*a* and P1*b*. Conversely, the first operation can include cyclically operating the second switch 212 in the non-conducting state for the first duration T1 followed by the conducting state for the predetermined first interval P1.

For example, the first switch 211 is shown in the conducting state at t=10 on the horizontal axis, during the first duration T1, and at end point T1*b*, where t=t1 on the horizontal axis, the first switch 211 is toggled to the non-conducting state at the start point P1*a* to begin the first interval P1. Then, at the end point P1*b*, the first interval P1 ends where t=t4 on the horizontal axis, and the first switch 211 is cycled back to the conducting state at the start point T1*a* to begin the first duration T1.

With reference to diagram 4*c*, based on the predetermined duty cycle, the fourth switch 214 is cyclically operated in the non-conducting (OFF) state for the second interval P2, followed by a second duration T2 in a conducting (ON) state. The second duration T2 includes a start point T2*a*, and an end point T2*b*, with the duration of T2 being an elapsed time between T2*a* and T2*b*. Similarly, the second interval P2 includes a start point P2*a*, and an end point P2*b*, with the duration of P2 being an elapsed time between P2*a* and P2*b*. Conversely, the second operation can include cyclically operating the third switch 213 in a non-conducting (OFF) state for the second duration T2, followed by the predetermined second interval P2. More specifically, the fourth switch 214 is shown in the non-conducting state at t=10 on the horizontal axis during the second interval P2, until reaching the start point at T2a, where t=t1.8 on the horizontal axis, the fourth switch 214 is toggled to the conducting state for the second duration T2, which ends at t=t2.8 on the horizontal axis, when the fourth switch 214 is cycled back to the non-conducting state at the start point P2a for the second interval P2.

Notably, in this instance depicted in FIG. 4, the second duration T2 is advanced in time (e.g., from t=t2 under a balanced condition as depicted in FIG. 3) to t=t1.8 due to the imbalanced operating condition, but the duration or length with respect to time of the second duration T2 remains the same. As depicted, by advancing the second duration T2 in time, more charging current Ic advantageously flows from the second capacitor 222 (e.g., from the positive terminal, as shown) in the imbalanced operating condition than would have under a balanced operating condition, without need to modify the length of the second duration T2 with respect to time.

FIG. 7 depicts a method 700 of operating a power converter 200. Although described in terms of a power converter, it will be appreciated that the method 700 can be applied to any electronic device. While the method 700 will be described herein, for ease of understanding, in terms of the power converter 200 described with reference to FIGS. 2-5, other aspects are not so limited and the method 700 can be implemented with any power converter without departing from the scope of the disclosure. In non-limiting aspects, the power converter 200 can be arranged as a DC-DC power converter.

The power converter 200 can include the set of input terminals such as a first input terminal 201, the second input terminal 202, and the neutral input terminal 203. The power converter 200 can include the first output terminal 204 and the second output terminal 205. The set of input capacitors 220 including the first capacitor 221 and the second capacitor 222 and can be coupled electrically in series between the first input terminal 201 and second input terminal 202. The power converter 200 can also include the first set of switches 210a, the second set of switches 210b, the first output terminal 204, and the second output terminal 205. The output capacitor 223, can be coupled in series between the first output terminal 204 and second output terminal 205. The first input terminal 201 can be coupled to the positive DC bus (not shown), the second input terminal 202 can be coupled to a negative DC bus (not shown), and the neutral input terminal 203 can be coupled to a neutral bus (not shown). The first voltage V1 can be defined across the first capacitor 221, and the second voltage V2 can be defined across the second capacitor C2. The third voltage V3 (e.g., an output voltage) can be defined across the output capacitor 223.

The first set of switches 210a can include the first switch 211, and the second switch 212. The second set of switches 210b can include the third switch 213, and the fourth switch 214. Each of the switches 211-214 can also include respective gate drive circuits 250. The set of gate drive circuits 250 can be communicatively coupled to the controller 226 to receive one of the first command signal 251 or the second command signal 254 from the controller 226. In non-limiting aspects, the controller 226 can comprise the controller 226, The controller 226 can be further communicatively coupled to the set of sensors 270.

The set of sensors 270 can be configured to detect, measure, or otherwise sense a respective electrical parameter (e.g., a voltage) associated with an operation of the power converter 200. Each sensor 270 can be arranged to provide a respective sensor signal 270a to the controller 226 indicative of a value of the respective electrical parameter. The value of the respective electrical parameter can be, directly or indirectly, at least partially indicative of a first voltage V1 across the first capacitor 221, or the second voltage V2 across the second capacitor 222, or both.

The first switch 211, the second switch 212, the third switch 213, and the fourth switch 214 can be coupled electrically in series. Based on the respective operating state (e.g., ON or OFF) of the switches 211-214, the charging current Ic is provided from the third capacitor C3. The charging current Ic can flow in a first direction (with respect to the neutral input terminal 203) to the first capacitor 221, or in a second direction (with respect to the neutral input terminal 203) to the second capacitor 222.

The method 700 begins, at 710, by cyclically commanding, by the controller 226, a first operation of the first set of switches 210a to supply the charging current Ic the first capacitor 221 for a fixed first duration T1, followed by a first interval P1 to terminate the charging current Ic to the first capacitor 221. The method includes, at 720, cyclically commanding, by the controller 226, a second operation of the second set of switches 210b to provide the charging current Ic to the second capacitor 222 for a fixed second duration T2 followed by a second interval P2 to terminate the charging current Ic to the second capacitor 222. The fixed first duration T1 and fixed second duration T2 can be based on predetermined respective duty cycles of the first and second sets of switches 210a, 210b. In non-limiting aspects, the cyclically commanding the first operation includes supplying, by the controller 226, the first command signal 251 to the first set of switches 210a. Additionally, in non-limiting aspects, the commanding the second operation includes supplying, by the controller 226, the second command signal 254 to the second set of switches 210b.

The method 700 can include, at 730, determining whether an imbalance condition exits based on a comparison of a magnitude of the first voltage V1 across the first capacitor 221 with a magnitude of the second voltage V2 across the second capacitor 222. For example, the determining by the controller 226 whether an imbalance condition exits can include determining, by the controller 226, the magnitude of the first voltage V1 and the magnitude of the second voltage V2 based on sensor signals 270a received from the sensors 270. In non-limiting aspects, the determining by the controller 226 that an imbalance condition exists can include determining the magnitude of the first voltage V1 across the first capacitor 221 does not equal a magnitude of the second voltage V2 across the second capacitor 222. In another non-limiting instance, the determining by the controller 226 that an imbalance condition exists can include determining a difference between the magnitude of the first voltage V1 across the first capacitor 221 and the magnitude of the second voltage V2 across the second capacitor 222 is greater than a predetermined range or a predetermined magnitude.

In the event that an imbalance condition is determined to exist, the method 700 can include at 740, advancing or delaying a start of one of the first duration T1 or the second duration T2, or both. In non-limiting aspects, the advancing or delaying the start of the first duration T1 can comprise a phase shift or timing advance of the first command signal 251. In non-limiting aspects, the advancing or delaying the start of the second duration T2 can comprise a phase shift or timing advance of the second command signal 254. For example, in non-limiting aspects, based on a determination that an imbalance condition exists, the controller 226 can be configured to advance the first duration T1 of the first set of switches 210*a* by advancing or supplying the first command signal 251 to the first set of switches 210*a* at an earlier point in time than would have been supplied during a balanced charging condition, without changing the length of the first duration T1. The magnitude (e.g., time) of the advance can be based on or proportional to a magnitude of the difference between the first voltage V1 and the second voltage V2.

Alternatively, in non-limiting aspects, based on a determination that an imbalance condition exists, the controller 226 can be configured to delay the first duration T1 of the first set of switches 210*a* by delaying or supplying the first command signal 251 to the first set of switches 210*a* at a later point in time than would have been supplied during a balanced charging condition, without changing the length of first duration T1. The magnitude (e.g., time) of the delay can be based on or proportional to a magnitude of the difference between the first voltage V1 and the second voltage V2.

Additionally, or alternatively, in non-limiting aspects, based on a determination that an imbalance condition exists, the controller 226 can be configured to advance the second duration T2 of the second set of switches 210*b* by advancing or supplying the second command signal 254 to the second set of switches 210*b* at an earlier point in time than would have been supplied during a balanced charging condition, without changing the length of the second duration T2. The magnitude (e.g., time) of the advance can be based on or proportional to a magnitude of the difference between the first voltage V1 and the second voltage V2.

In other non-limiting aspects, based on a determination that an imbalance condition exists, the controller 226 can be configured to delay the second duration T2 of the second set of switches 210*b* by delaying or supplying the second command signal 254 to the second set of switches 210*b* at a later point in time than would have been supplied during a balanced charging condition, without changing the length of the second duration T2. The magnitude (e.g., time) of the delay can be based on or proportional to a magnitude of the difference between the first voltage V1 and the second voltage V2.

For example, in the event the imbalance condition is determined based on a magnitude of the first voltage V1 that is greater than the magnitude of the second voltage V2, the advancing or delaying the start of one of the first duration T1 or second duration T2 can include one of an advance to the first command signal 251 or a delay to the second command signal 254, or both. Alternatively, in the event the imbalance condition is determined based on a magnitude of the first voltage V1 that is less than the magnitude of the second voltage V2, the advancing or delaying the start of one of the first or second duration T1, T2 comprises one of a delay to the first command signal 251 or an advance to the second command signal 254, or both.

The sequence depicted is for illustrative purposes only and is not meant to limit the method 700 in any way as it is understood that the portions of the method can proceed in a different logical order, additional or intervening portions can be included, or described portions of the method can be divided into multiple portions, or described portions of the method can be omitted without detracting from the described method.

To the extent not already described, the different features and structures of the various aspects can be used in combination with each other as desired. That one feature cannot be illustrated in all of the aspects is not meant to be construed that it cannot be but is done for brevity of description. Thus, the various features of the different aspects can be mixed and matched as desired to form new aspects, whether or not the new aspects are expressly described. Combinations or permutations of features described herein are covered by this disclosure.

Further aspects are provided by the subject matter of the following clauses:

A power converter comprising: a first set of switches coupled in series with a second set of switches; a first capacitor arranged to receive an electrical current from the first set of switches; a second capacitor arranged to receive the electrical current from the second set of switches; and a controller communicatively coupled to the first set of switches and the second set of switches, and configured to cyclically command a first operation of the first set of switches to supply the electrical current to the first capacitor for a first duration and to terminate the electrical current to the first capacitor for a first interval, the controller further configured to cyclically command a second operation of the second set of switches to provide the electrical current to the second capacitor for a second duration and to terminate the electrical current to the second capacitor for a second interval, the controller further configured to determine an imbalance condition exits based on a comparison of a first voltage across the first capacitor with a second voltage across the second capacitor, and wherein when an imbalance condition exists, the controller is configured to one of advance or delay a start of one of the first duration or the second duration, or both.

The power converter of any preceding clause, wherein the first duration and the second duration are based on a respective duty cycle of the first set of switches and the second set of switches.

The power converter of any preceding clause, wherein the controller commands the first operation based on a comparison of a first carrier signal with the respective duty cycle of the first set of switches, and further commands the second operation based on a comparison of a second carrier signal with the respective duty cycle of the second set of switches.

The power converter of any preceding clause, wherein when an imbalance condition exists, the controller is configured to one of advance or delay one of the first carrier signal, the second carrier signal, or both, such that the first carrier signal and second carrier signal are asymmetric with respect to each other.

The power converter of any preceding clause, wherein the controller commands the first operation by supplying a first command signal to the first set of switches, and commands the second operation by supplying a second command signal to the second set of switches.

The power converter of any preceding clause, wherein the one of advance or delay the start of one of the first duration or the second duration, or both, is based on an advance or a delay of at least one of the first command signal or second command signal, respectively.

The power converter of any preceding clause, further comprising a set of sensors communicatively coupled to the controller, the set of sensors arranged to detect the first voltage across the first capacitor, and the second voltage across the second capacitor, the set of sensors configured to supply a respective sensor signal indicative of a magnitude of the first voltage and a magnitude of the second voltage to the controller.

The power converter of any preceding clause, wherein the controller is configured to determine a magnitude of the first voltage and a magnitude of the second voltage based on the first respective sensor signals, determine the magnitude of the second voltage based on the respective sensor signals, and to further determine the imbalance condition exists based on a difference between the first voltage and the second voltage.

The power converter of any preceding clause, wherein a magnitude of the one of advance or delay of the start of one of the first duration or the second duration, or both, is proportional to a magnitude of the difference between the first voltage and the second voltage.

The power converter of any preceding clause, wherein when the imbalance condition is determined based on a magnitude of the first voltage that is greater than the magnitude of the second voltage, the advance or delay of the start of one of the first duration or the second duration, or both, comprises one of an advance to the first command signal or a delay to the second command signal, or both.

The power converter of any preceding clause, wherein when the imbalance condition is determined based on a magnitude of the first voltage that is less than the magnitude of the second voltage, the one of advance or delay the start of one of the first duration or the second duration, or both, comprises one of a delay to the first command signal or an advance to the second command signal.

A method of operating a power converter including a first set of switches coupled in series with a second set of switches, a first capacitor arranged to receive an electrical current from the first set of switches, a second capacitor arranged to receive the electrical current from the second set of switches; the first set of switches and the second set of switches communicatively coupled to a controller, the method comprising: cyclically commanding, by the controller, a first operation of the first set of switches to supply an electrical current to the first capacitor for a first duration and terminate the electrical current to the first capacitor for a first interval; cyclically commanding, by the controller, a second operation of the second set of switches to provide the electrical current to the second capacitor for a second duration and terminate the electrical current to the second capacitor followed for a second interval; determining, by the controller, an imbalance condition exits based on a comparison of a first voltage across the first capacitor with a second voltage across the second capacitor; and when an imbalance condition exists, one of advancing or delaying a start of one of the first duration or the second duration.

The method of any preceding clause, wherein the first duration and second duration are based on a respective duty cycle of the first set of switches and the second set of switches.

The method of any preceding clause, wherein a set of sensors is communicatively coupled to the controller, the set of sensors arranged to detect a first voltage across the first capacitor, and a second voltage across the second capacitor, the set of sensors configured to supply a respective sensor signal indicative of a magnitude of the first voltage and a a magnitude of the second voltage to the controller.

The method of any preceding clause, further comprising: determining, by the controller, the magnitude of the first voltage and the magnitude of the second voltage based on the respective sensor signals; wherein determining the imbalance condition exists comprises determining a difference between the first voltage and the second voltage.

The method of any preceding clause, wherein commanding the first operation includes supplying, by the controller, a first command signal to the first set of switches, and wherein commanding the second operation includes supplying, by the controller, a second command signal to the second set of switches.

The method of any preceding clause, wherein the one of advancing or delaying the start of one of the first duration or the second duration comprises one of an advance or a delay to at least one of the first command signal or the second command signal, respectively.

The method of claim of any preceding clause, wherein a magnitude of the one of the advance or the delay to at least one of the first command signal or the second command signal is proportional to a magnitude of the difference between the first voltage and the second voltage.

The method of claim of any preceding clause, wherein when the imbalance condition is determined based on a magnitude of the first voltage that is greater than the magnitude of the second voltage, the advancing or delaying the start of one of the first duration or the second duration comprises one of a respective advance to the first command signal or delay to the second command signal.

The method of any preceding clause, wherein when the imbalance condition is determined based on a magnitude of the first voltage that is less than the magnitude of the second voltage, the advancing or delaying the start of one of the first duration or the second duration comprises one of a respective delay to the first command signal or advance to the second command signal.

As disclosed herein, aspects of a power converter include a first and a second set of switching elements communicatively coupled with a first capacitor and a second capacitor. A controller is configured to cyclically command a first operation of the first set of switches to supply an electrical current to the first capacitor for a first duration, followed by a first interval to terminate the electrical current to the first capacitor. The controller is further configured to cyclically command a second operation of the second set of switches to provide the electrical current to the second capacitor for a second duration followed by a second interval to terminate the electrical current to the second capacitor. The controller is further configured to determine an imbalance condition exits based on a comparison of a first voltage across the first capacitor with a second voltage across the second capacitor. When an imbalance condition exists, the controller is configured to one of advance or delay a start of at least one of the first duration and the second duration.

Aspects as disclosed herein provide an electrical power converter and control method, to control operation of the switches based on a fixed ON-time duration, while shifting (e.g., advancing or delaying) the ON time duration of the switches with respect to time to achieve a balanced charging condition. In contrast to conventional power converters and control methods, aspects as disclosed herein do not depend on the direction of the charging current Io. Furthermore, aspects as described herein enable a arranging a balanced operation (e.g., a balanced charging condition or balanced voltage across the upper and lower input capacitors C1, C2) without the need to determine a direction of the charging current Io, which enables balanced operation of the power converter even at very low power levels down to and including a no-load operation.

What is claimed is:

1. A power converter comprising:
   a first set of switches coupled in series with a second set of switches;
   a first capacitor arranged to receive an electrical current from the first set of switches;
   a second capacitor arranged to receive the electrical current from the second set of switches;
   a controller communicatively coupled to the first set of switches and the second set of switches, and configured to cyclically command a first operation of the first set of switches to supply the electrical current to the first capacitor for a first duration and to terminate the electrical current to the first capacitor for a first interval, the controller further configured to cyclically command a second operation of the second set of switches to provide the electrical current to the second capacitor for a second duration and to terminate the electrical current to the second capacitor for a second interval, the controller further configured to determine an imbalance condition exists based on a comparison of a first voltage across the first capacitor with a second voltage across the second capacitor;

wherein when an imbalance condition exists, the controller is configured to one of advance or delay a start of at least one of the first duration and the second duration;

wherein the first duration and the second duration are based on a respective duty cycle of the first set of switches and the second set of switches; and wherein the controller commands the first operation based on a comparison of a first carrier signal with the respective duty cycle of the first set of switches, and further commands the second operation based on a comparison of a second carrier signal with the respective duty cycle of the second set of switches.

2. The power converter of claim 1, wherein, when an imbalance condition exists, the controller is configured to one of advance or delay one of the first carrier signal, the second carrier signal, or both, such that the first carrier signal and the second carrier signal are asymmetric with respect to each other.

3. The power converter of claim 1, wherein the controller commands the first operation by supplying a first command signal to the first set of switches, and commands the second operation by supplying a second command signal to the second set of switches.

4. The power converter of claim 3, wherein the one of advance or delay the start of one of the first duration or the second duration, or both, is based on an advance or a delay of at least one of the first command signal or the second command signal, respectively.

5. The power converter of claim 3, further comprising a set of sensors communicatively coupled to the controller, the set of sensors arranged to detect the first voltage across the first capacitor, and the second voltage across the second capacitor, the set of sensors configured to supply a respective sensor signal indicative of a magnitude of the first voltage and a magnitude of the second voltage to the controller.

6. The power converter of claim 5, wherein the controller is configured to determine a magnitude of the first voltage and a magnitude of the second voltage based on the respective sensor signals, determine the magnitude of the second voltage based on the respective sensor signals, and to further determine the imbalance condition exists based on a difference between the first voltage and the second voltage.

7. The power converter of claim 6, wherein a magnitude of the one of advance or delay of the start of at least one of the first duration and the second duration, is proportional to a magnitude of the difference between the first voltage and the second voltage.

8. The power converter of claim 6, wherein when the imbalance condition is determined based on a magnitude of the first voltage that is greater than the magnitude of the second voltage, the one of advance or delay of the start of at least one of the first duration and the second duration, comprises one of an advance to the first command signal or a delay to the second command signal.

9. The power converter of claim 6, wherein when the imbalance condition is determined based on a magnitude of the first voltage that is less than the magnitude of the second voltage, the one of advance or delay the start of one of the first duration or the second duration, or both, comprises one of a delay to the first command signal or an advance to the second command signal.

10. A method of operating a power converter including a first set of switches coupled in series with a second set of switches, a first capacitor arranged to receive an electrical current from the first set of switches, a second capacitor arranged to receive the electrical current from the second set of switches; the first set of switches and the second set of switches communicatively coupled to a controller, the method comprising:

cyclically commanding, by the controller, a first operation of the first set of switches to supply the electrical current to the first capacitor for a first duration and terminate the electrical current to the first capacitor for a first interval;

cyclically commanding, by the controller, a second operation of the second set of switches to provide the electrical current to the second capacitor for a second duration and terminate the electrical current to the second capacitor followed for a second interval;

determining, by the controller, an imbalance condition exists based on a comparison of a first voltage across the first capacitor with a second voltage across the second capacitor;

when an imbalance condition exists, one of advancing or delaying a start of one of the first duration or the second duration;

wherein the first duration and the second duration are based on a respective duty cycle of the first set of switches and the second set of switches; and wherein the controller commands the first operation based on a comparison of a first carrier signal with the respective duty cycle of the first set of switches, and further commands the second operation based on a comparison of a second carrier signal with the respective duty cycle of the second set of switches.

11. The method of claim 10, wherein a set of sensors is communicatively coupled to the controller, the set of sensors arranged to detect the first voltage across the first capacitor, and the second voltage across the second capacitor, the set of sensors configured to supply a respective sensor signal indicative of a magnitude of the first voltage and a magnitude of the second voltage to the controller.

12. The method of claim 11, further comprising:

determining, by the controller, the magnitude of the first voltage and the magnitude of the second voltage based on the respective sensor signals;

wherein determining the imbalance condition exists comprises determining a difference between the first voltage and the second voltage.

13. The method of claim 10, wherein commanding the first operation includes supplying, by the controller, a first command signal to the first set of switches, and wherein commanding the second operation includes supplying, by the controller, a second command signal to the second set of switches.

14. The method of claim 13, wherein the one of advancing or delaying the start of one of the first duration or the second duration comprises one of an advance or a delay to at least one of the first command signal or the second command signal, respectively.

15. The method of claim 14, wherein a magnitude of the one of the advance or the delay to at least one of the first command signal or the second command signal is proportional to a magnitude of the difference between the first voltage and the second voltage.

16. The method of claim 15, wherein when the imbalance condition is determined based on a magnitude of the first voltage that is greater than the magnitude of the second voltage, the advancing or delaying the start of one of the first duration or the second duration comprises one of a respective advance to the first command signal or delay to the second command signal.

17. The method of claim 15, wherein when the imbalance condition is determined based on a magnitude of the first voltage that is less than the magnitude of the second voltage, the advancing or delaying the start of one of the first duration or the second duration comprises one of a respective delay to the first command signal or advance to the second command signal.

* * * * *